US011913572B2

(12) United States Patent
Evans

(10) Patent No.: US 11,913,572 B2
(45) Date of Patent: Feb. 27, 2024

(54) HOT BOLT CLAMP

(71) Applicant: TEAM INDUSTRIAL SERVICES, INC., Sugar Land, TX (US)

(72) Inventor: Oliver Bryn Evans, Sugar Land, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 332 days.

(21) Appl. No.: 17/437,829

(22) PCT Filed: Mar. 13, 2020

(86) PCT No.: PCT/US2020/022560
§ 371 (c)(1),
(2) Date: Sep. 9, 2021

(87) PCT Pub. No.: WO2020/186140
PCT Pub. Date: Sep. 17, 2020

(65) Prior Publication Data
US 2022/0154858 A1 May 19, 2022

Related U.S. Application Data

(60) Provisional application No. 62/817,762, filed on Mar. 13, 2019.

(51) Int. Cl.
F16L 23/00 (2006.01)
B23D 21/02 (2006.01)
(Continued)

(52) U.S. Cl.
CPC .......... F16L 23/003 (2013.01); B23D 21/02 (2013.01); B23D 29/007 (2013.01); F16L 55/18 (2013.01)

(58) Field of Classification Search
CPC ...... B23D 29/007; F16L 55/18; F16L 23/003; F16L 23/02
See application file for complete search history.

(56) References Cited

U.S. PATENT DOCUMENTS 1,587,251 A * 6/1926 Streicher ................. F16L 23/02
285/414
3,152,816 A 10/1964 Smith
(Continued)

OTHER PUBLICATIONS

International Search Report and Written Opinion in related application PCT/US2020/022560 dated Jun. 3, 2020.

Primary Examiner — David Bochna
(74) Attorney, Agent, or Firm — Patterson + Sheridan, LLP

(57) ABSTRACT

A hot bolt clamp and method for repairing a multi-bolt flange of a pipe. The clamp has enclosures that can be assembled around the multi-bolt flange. The clamp has a central opening extending through a first enclosure face and a second enclosure face for the pipe. The clamp includes a flange bolt cavities extending through the enclosure faces configured to enclose flange bolts and having a cutter channel connected to each flange bolt cavity. Restraint bolts extend through the enclosure face to restrain the multi-bolt flange. Flange bolts can be removed and replaced during the repair operation. A cutter tool apparatus can be extended through each cutter channel for use in removing stuck flange bolts. The clamp forms an injectable void around the multi-bolt flange that is injectable with sealant in the event of a loss of gasket integrity during the repair operation.

19 Claims, 13 Drawing Sheets

(51) Int. Cl.
    *B23D 29/00* (2006.01)
    *F16L 55/18* (2006.01)

(56) References Cited

U.S. PATENT DOCUMENTS

| | | | | |
|---|---|---|---|---|
| 3,997,957 | A * | 12/1976 | Tone | F16L 23/003 29/256 |
| 4,171,142 | A | 10/1979 | Harrison | |
| 4,271,870 | A * | 6/1981 | Butler | F16L 55/18 285/368 |
| 4,927,181 | A * | 5/1990 | Ciotola | F16L 55/175 285/294.4 |
| 4,927,182 | A * | 5/1990 | Moore | F16L 55/175 277/609 |
| 5,004,275 | A | 4/1991 | Miller | |
| 5,118,139 | A | 6/1992 | Lott | |
| 6,244,630 | B1 | 6/2001 | Baucom et al. | |
| 6,305,719 | B1 | 10/2001 | Smith, Jr. et al. | |
| 7,384,076 | B2 | 6/2008 | Bradley | |
| 7,934,317 | B2 | 5/2011 | Chiu | |
| 8,667,693 | B2 * | 3/2014 | Ellis | B23D 45/12 30/92 |
| 8,979,138 | B2 | 3/2015 | Dole et al. | |
| 9,631,750 | B1 * | 4/2017 | Veazey | F16L 23/003 |
| 2008/0010801 | A1 * | 1/2008 | Carson | B23D 29/007 29/282 |
| 2010/0244443 | A1 | 9/2010 | Irgens | |

* cited by examiner

HOT BOLT CLAMP

CROSS-REFERENCE TO RELATED APPLICATIONS

This application is a National Phase filing under 35 U.S.C § 371 of International Application PCT/US2020/022560, filed on Mar. 13, 2020, which claims the benefit of U.S. Provisional Patent Application No. 62/817,762, filed Mar. 13, 2019, each of which is incorporated herein by reference in its entirety for all purposes.

TECHNICAL FIELD

In general, this disclosure relates to a hot bolt clamp for hot bolting a flange coupling on a pipe and, more particularly, to a hot bolt clamp for live replacement of flange bolts securing a flange coupling on a pipe.

BACKGROUND

Pipelines often develop leaks along pipe and pipe fitting connections. Leaks can occur due to factors such as pipe deterioration over time, impact structural damage, or use in harsh environments. Irrespective of the cause, shutting down the pipeline to enable the repair is extremely costly. Stopping the flow of product through the pipeline for the duration of the repair results in delayed delivery and lost revenue for the pipeline operator.

One such pipe fitting connection is a flanged pipe coupling. These couplings are widely used for connecting sections of pipe which operate in moderate to high pressures. Seals are utilized between the flanges, with one of the more common configurations being the use of a raised face on the inner portion of each of the flanges with an annular gasket being placed between the raised faces. A seal is formed by bolting the flanges together, resulting in the raised faces compressing the gasket material.

Deterioration of the gasket materials and shifting of the pipe, among other causes, result in leaks in the flange pipe couplings. Similarly, a defect in the manufacture of the pipe or damage to the pipe or couplings during or after installation may cause leaks to occur. Such leaks must be repaired and typically have required the pipeline to be shut down and drained of its contents before the repair could be performed.

Many operators explicitly prevent hot bolting of four (4) bolt flanges due to associated challenges. Traditional methods carry significant risk of flange rotation and loss of containment. Many products exist that reinstate mechanical integrity through the provision of restraints (heal clamps, grippers, lap plates, g-clamps etc.). One key hazard that remains with all these solutions is the possible loss of containment during the operation and more importantly what can be done if this occurs.

What is needed, therefore, is an improved apparatus and method of pipe repair that allows multi-bolt flange repair and does not require shutting down the pipeline.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of the disclosure provides a hot bolt clamp for assembly around a multi-bolt flange of a pipe. The hot bolt clamp includes a lower enclosure and an upper enclosure positionable around the multi-bolt flange to form a clamp body having a first enclosure face and a second enclosure face. The lower enclosure and the upper enclosure form a central opening extending through the first enclosure face and the second enclosure face. The hot bolt clamp further includes a plurality of flange bolt cavities extending through the first enclosure face and the second enclosure face and extending around the central opening; a plurality of restraint bolts extendable through the first enclosure face and the second enclosure face and extending around the central opening; a plurality of cutter channels in the first enclosure face and the second enclosure face connecting to the plurality of flange bolt cavities; a cutter tool apparatus extendable through at least one of the plurality of cutter channels to access at least one of the flange bolt cavities; and a sealant injection channel extending through the clamp body to the central opening.

An embodiment of the disclosure provides a method of repairing a multi-bolt flange of a pipe having a first bolt extending through the multi-bolt flange with a first flange bolt nut disposed adjacent a first flange face and a second flange bolt nut disposed adjacent a second flange face, using a hot bolt clamp of the present disclosure. The method of repairing the multi-bolt flange including connecting the lower enclosure and the upper enclosure around the multi-bolt flange to position a first flange bolt nut and the second flange bolt nut in the first flange bolt cavity on opposite sides of the multi-bolt flange; positioning the plurality of retaining bolts from a retaining bolt retracted position to a retaining bolt extended position where each of the plurality of retaining bolts has a distal end pressing against either the first flange face or the second flange face; removing the first flange bolt nut from the first flange bolt cavity; and replacing the first flange bolt nut with a first replacement nut.

An embodiment of the disclosure provides a hot bolt clamp for assembly around a multi-bolt flange of a pipe. The hot bolt clamp includes a lower enclosure and an upper enclosure positionable around the multi-bolt flange having a first enclosure face and a second enclosure face. The lower enclosure and the upper enclosure form a central opening extending through the first enclosure face and the second enclosure face. The hot bolt clamp further includes a plurality of flange bolt cavities extending through the first enclosure face and the second enclosure face and extending around the central opening; a plurality of restraint bolts extendable through the first enclosure face and the second enclosure face and extending around the central opening; and a plurality of cutter channels in the first enclosure face and the second enclosure face connecting to the plurality of flange bolt cavities.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
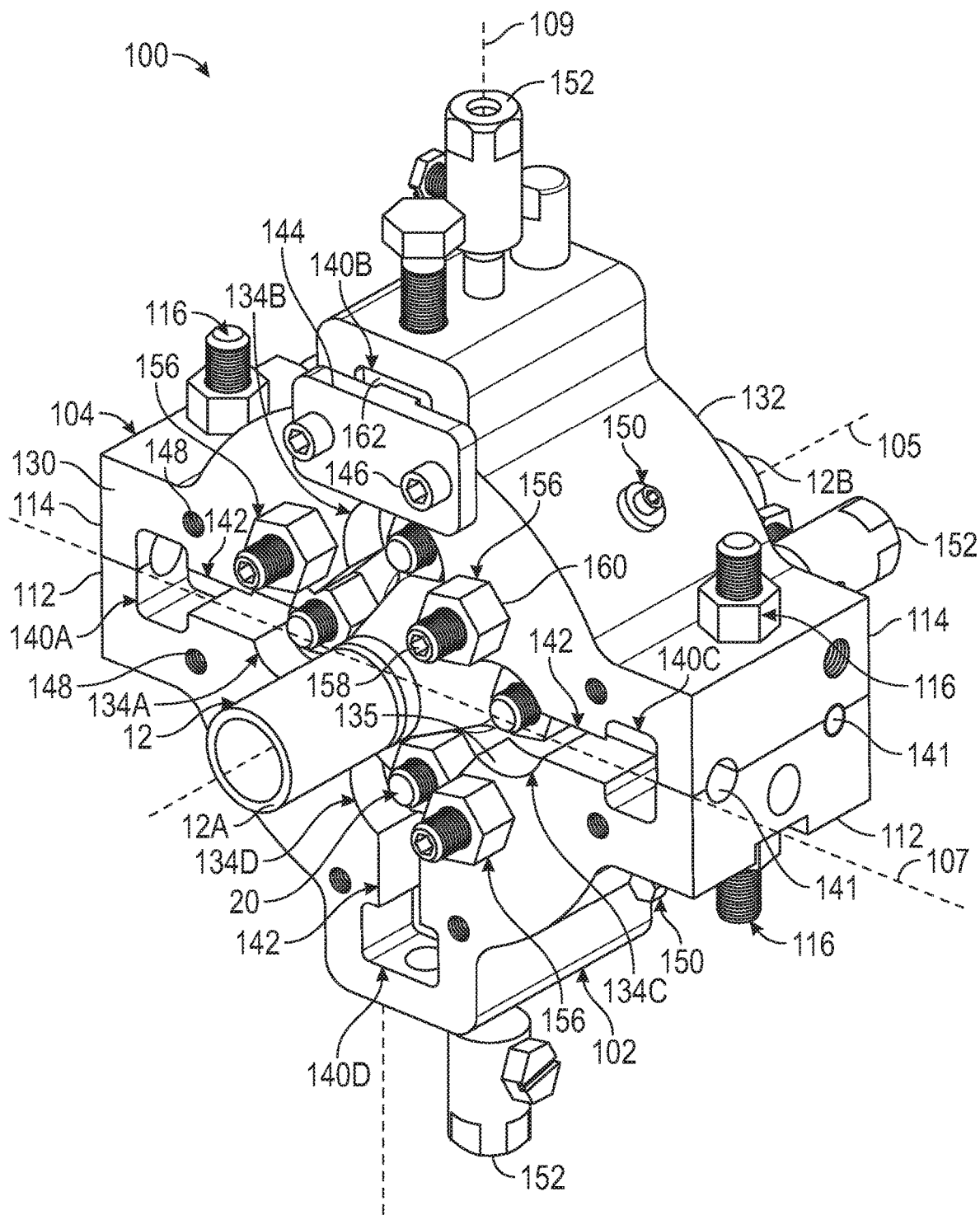
FIG. 1 is a perspective view of a hot bolt clamp assembled on a multi-bolt flange according to embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

In general, this present disclosure relates to a hot bolt clamp for hot bolting a flange coupling on a pipe and, more particularly, to a hot bolt clamp for live replacement of flange bolts securing a flange coupling and sealing the flange coupling in the event of a leak in the flange coupling during replacement of the flange bolts. The flange couplings may connect two pipe sections and in some embodiments flange coupling may include a valve bonnet flange. Embodiments of the present disclosure mitigate the risks associated with hot bolting of multi-bolt flanges, including four (4) bolt flanges, by providing all the features required for hot bolting within a repair clamp.

The present disclosure can be used for hot bolting, reinstating mechanical integrity, and on-stream repair. The present disclosure enables all three scenarios to be dealt with safely with one product. Embodiments of the hot bolt clamp of the present disclosure comprise an injectable peripheral seal which can be energized if required at any point during the operation. The hot bolt clamp is designed generally in accordance with ASME VIII Division 1 and is calculated and manufactured to the same exacting quality standards as on-stream repair clamps.

The hot bolt clamp of the present disclosure allows each of the fasteners in a multi-bolt flange, including a four (4) bolt flange, to be removed one by one and replaced. At all points during the operation axial loads due to internal pressure are supported by the hot bolt clamp. The flanges cannot rotate during the operation due to the design incorporated in the hot bolt clamp. Any potential loss of containment due to gasket degradation or previous "check tightening" and resulting relaxation can be safely contained. Total loss of flange bolting integrity can be supported by the clamp. Nut splitting capability may additionally be built into the hot bolt clamp.

Although embodiments of the present disclosure are described with reference to a four (4) bolt flange, it should be understood by one skilled in the art that the present disclosure is not so limited. The hot bolt clamp of the present disclosure may be used for flanges having any number bolts as well as any number of bolt configurations.

Embodiments of the present disclosure can be installed to reinstate mechanical integrity where the bolting is in question. It is possible that during an intended hot bolting operation the decision may be made that the operation will not be successful and that the hot bolt clamp of the present disclosure needs to be left on until the next available shutdown.

Embodiments of the present disclosure may comprise an injectable void as per on-stream repair clamps. The integrity of the gasket can be monitored either by venting the void to atmosphere if appropriate or using a pressure gauge. If at any point the gasket integrity is lost, the void can be injected to provide an on-stream repair suitable to remain until the next available shutdown.

Embodiments of the present disclosure provide a hot bolt clamp that allows each of the fasteners in a four (4) bolt flange to be removed and replaced individually in a safe manner maintaining a safe working environment. As discussed above, the hot bolt clamp of the present disclosure may be used on flanges having any number of bolts and is not limited to four (4) bolt flanges. Flanges with multiple bolts may be referred to as multi-bolt flanges. Multi-bolt flanges may have two (2) bolts, three (3) bolts, four (4) bolts, or more flange bolts. The use of the hot bolt clamp during bolting operations ensures axial loads formulated due to internal pressure are supported throughout. The unique design prevents the flange from rotating during the operation and incorporates built-in nut splitting capabilities. Should there be a loss of gasket integrity during the operation, the ho
t bolt clamp can be injected with a leak sealing enclosure and left until the next available shut down.

Figure 2:
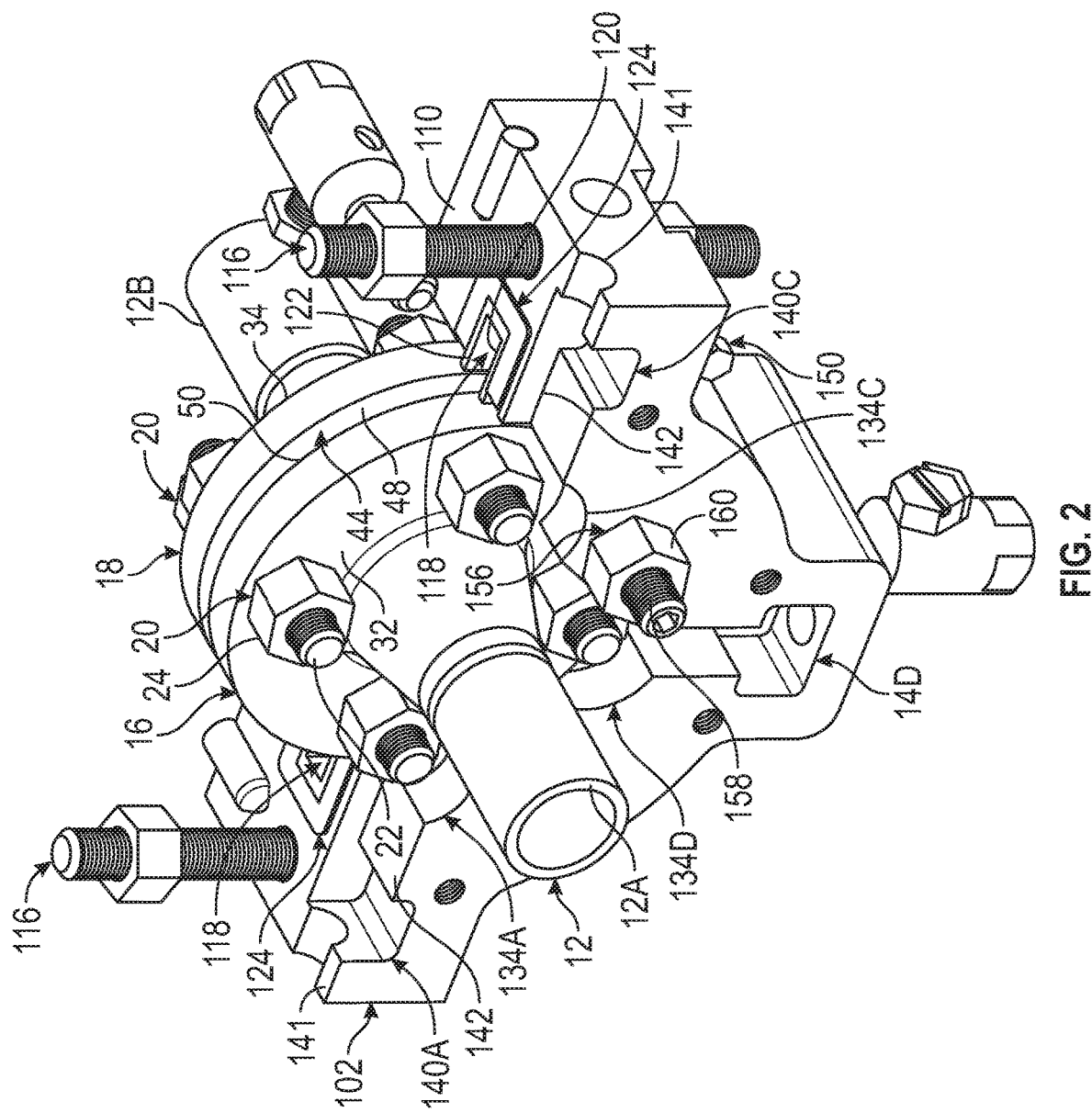
FIG. 2 is a lower enclosure of the hot bolt clamp assembled on a multi-bolt flange according to embodiments of the present disclosure.

Referring to FIG. 1, a hot bolt clamp 100 is shown assembled on a pipe 12. Clamp 100 includes a lower enclosure 102 and an upper enclosure 104 that mate with one another over the pipe 12. Enclosures 102, 104 may each form a half of the clamp 100 and when connected form the clamp body having a central opening 129 through which the pipe 12 extends. Lower enclosure 102 and the upper enclosure 104 may be referred to as a first enclosure and a second enclosure, and the lower enclosure 102 and the upper enclosure 104 may be assembled in different orientations around the pipe 12. As shown in FIG. 2, the pipe 12 may include a first pipe section 12A and a second pipe section 12B that are coupled together by a flanged pipe coupling formed by a first pipe flange 16 at an end of the first pipe section 12A and a second pipe flange 18 at an end of the second pipe section 12B. Flange bolts 20 secure the pipe flanges 16, 18 together at opposing internal pipe flange faces in an end-to-end configuration, as shown in FIG. 1. The pipe flanges 16, 18 bolted together may be referred to as a multi-bolt flange. Flange bolts 20 each are formed by a bolt shaft 22 and flange nuts 24 secured at end sections of the bolt shaft 22. A first axis 105 extend through the pipe 12 and the clamp 100. First axis 105 may be a centerline of the pipe 12. First axis 105 may be the centerline of the enclosures 102, 104 forming the clamp 100, as shown in FIG. 1. Bolt shafts 22 connecting the pipe flanges 16, 18 may be parallel to the first axis 105.

Figure 7:
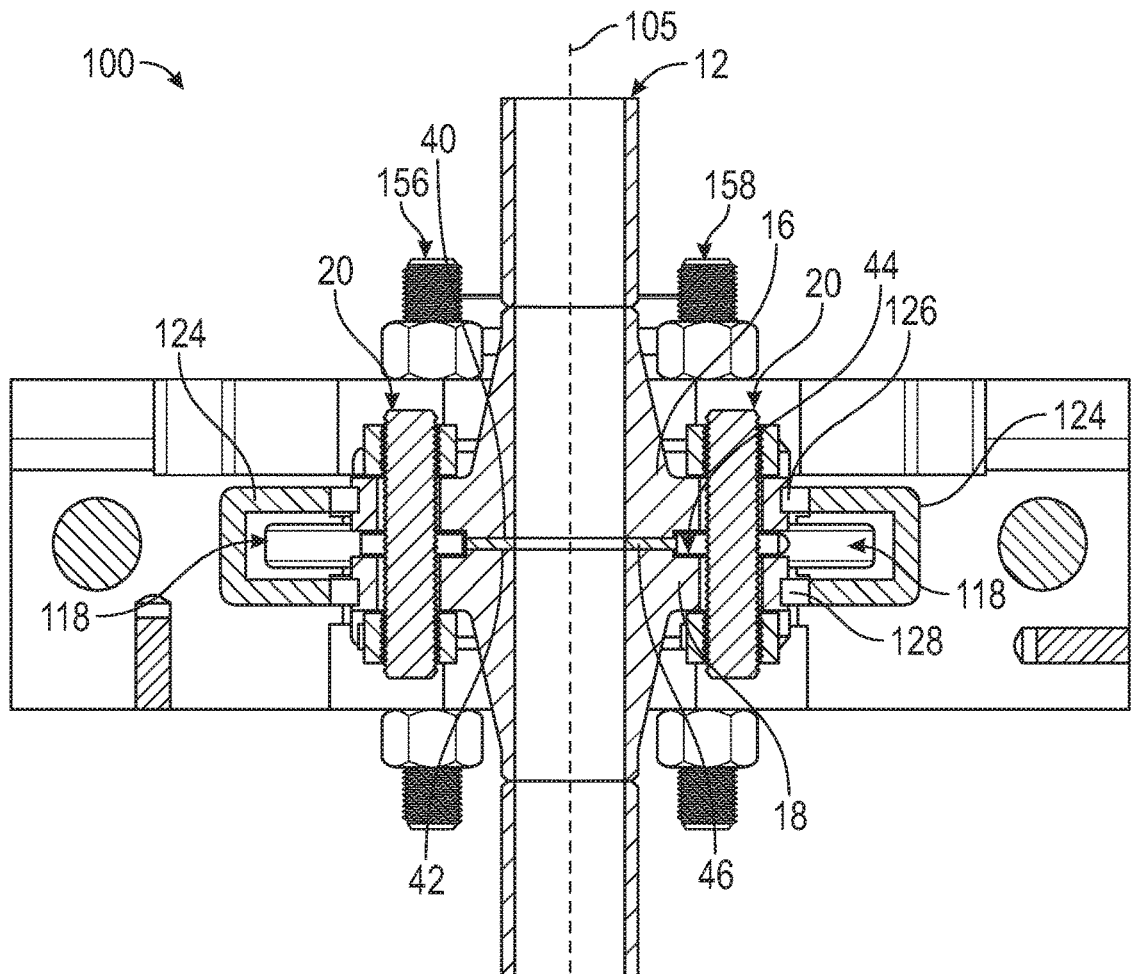
FIG. 7 is a cross-sectional view of the hot bolt clamp assembled on the multi-bolt flange taken along lines 7-7 of FIG. 5B according to embodiments of the present disclosure.

Pipe flanges 16, 18 may each have a raised face 40, 42 disposed adjacent one another and a seal ring disposed between the raised faces 40, 42, as shown in FIG. 7, to form a seal between the pipe flanges 16, 18. Raised faces 40, 42 cause a flange gap 44, shown in FIG. 2, to be formed between opposing flange faces 48, 50.

Lower enclosure 102 a pair of spaced-apart lower enclosure flanges 112 extending outwardly in opposite direction from a lower enclosure portion. Upper enclosure 104 has a pair of spaced-apart upper enclosure flanges 114 extending outwardly in opposite direction from an upper enclosure portion. Enclosures 102, 104 are disposed adjacent one another and may abut at enclosure surfaces when in an installed or assembled position shown in FIG. 1. Enclosure surface of the lower enclosure 102 is labeled as 110 in FIG. 2. Enclosure surface 110 of the lower enclosure 102 is shown in FIG. 2. Enclosure fasteners formed by enclosure bolts 116 each extend through an enclosure bolt aperture 117, shown in FIG. 8, in the enclosure flanges 112, 114 to secure the enclosures 102, 104 in the installed position around the pipe 12. Enclosure bolts 116 each may include a bolt shaft and enclosure bolt nuts with the bolt shaft being perpendicular to the first axis 105.

Referring to FIG. 2, a sealant groove 118 is formed in the lower enclosure portion 106 and the upper enclosure portion 108. Sealant groove 118 may be formed by an annular groove in an internal enclosure surface of the enclosure portions 106, 108. Sealant groove 118 extends around the flange gap 44 of the pipe flanges 16 and 18. Sealant groove 118 may include a first groove wall 120 and a second groove wall 122 forming an injectable sealant void. The injectable sealant void is an annular void disposed adjacent to the flange gap 44. Groove walls 120, 122 are disposed on opposite sides of the flange gap 44. A pair of packers 124 may be disposed on the enclosure surface 110 on opposite sides of the enclosure pipe channel and the pipe 12 extending therethrough. Each packer 124 extends around a periphery of the sealant groove 118. Packers 124 may be formed from a gasket seal that is disposed between the enclosures 102, 104.

To connect the enclosures 102, 104 on the multi-bolt flange, the lower enclosure 102 of the clamp 100 is positioned onto the flanges 16, 18 of the pipe 12, as shown in FIG. 2. Subsequently, as shown in FIG. 1, the upper enclosure 104 of the clamp 100 is positioned onto the flanges 16, 18 and tightened through use of the enclosure fastener bolts 116.

When in an installed position, the clamp 100 has a first enclosure face 130 and a second enclosure face 132 space apart axially from one another along the first axis 105. Enclosure faces 130, 132 each have a face opening through which the pipe 12 extends. First enclosure face 130 is shown in FIG. 1. Enclosure faces 130, 132 will be described using the first enclosure face 130. Second enclosure face 132 is like the first enclosure face 130. First enclosure face 130 forms a central opening 129 sized to accommodate the outer diameter of the pipe 12. FIG. 1 shows the first enclosure face 130 with the clamp 100 in an installed position on the pipe 12.

Clamp 100 includes a plurality of flange bolt cavities 134, splitter block cavities 140, and cutter channels 142 formed in the first enclosure face 130. FIG. 1 shows four flange bolt cavities 134 that are individually identified as flange bolt cavities 134A-134D and four splitter block cavities 140 that are individually identified as splitter block cavities 140A-140D. Flange bolt cavities 134A-134D each extend through the first enclosure face 130 and the second enclosure face 132. One of the cutter channels 142 connect each of the flange bolt cavities to one of the splitter block cavities 140A-140D. In some embodiments there may be less than four flange bolt cavities 134 and splitter block cavities 140. In some embodiments there may be less than four flange bolt cavities 134 and splitter block cavities 140. FIG. 1 and FIG. 2 show an embodiment of the clamp 100 of the present disclosure assembled around a flanges 16, 18. Flanges 16, 18 shown are four (4) bolt flanges but it should be understood that the clamp 100 of the present disclosure can be used for flanges having any number of bolts.

Flange bolt cavities 134A-134D extend through the first enclosure face 130 and extend in a body of the clamp 100 formed by the enclosure portions 106, 108. Flange bolt cavities 134A-134D may generally be referred to as a flange bolt cavity 134. Flange bolt cavities 134A-134D are circumferentially spaced around the central opening 129 and are spaced apart from one another. Flange bolt cavities 134A-134D each has an internal surface 135, a radial opening 136 leading from the flange bolt cavity 134 to the central opening 129 extending through the first enclosure face 130, through the body of the clamp 100, and through the second enclosure face 132. Each of the flange bolt cavities 134A-134D is configured to fit around a periphery of one of the flange bolts 20. Each flange bolt cavity 134A-134D may have a semicircular shape or other shape to accommodate the flange bolt 20 disposed therein.

Splitter block cavities 140A-140D extend through the first enclosure face 130 and extend in a body of the clamp 100 formed by the enclosure portions 106, 108. Splitter block cavities 140A-140D are circumferentially spaced around the first axis 105 and are space apart from one another. Each splitter block cavity 140 is radially spaced from one of the flange bolt cavities 134. Each splitter block cavity 140A-140D is connected to one of the flange bolt cavities 134A-134D by a cutter channel 142. Each cutter channel 142 has an opening in the first enclosure face 130. A bolt aperture 141 extends through an outer surface of the clamp 100 to each of the splitter block cavities 140.

A second axis 107 extends through the splitter block cavities 140A, 140C and the flange bolt cavities 134A, 134C. Second axis 107 may be perpendicular to the first axis 105. Second axis 107 may extend through a center of the splitter block cavities 140A, 140C and the flange bolt cavities 134A, 134C. Splitter block cavities 140A, 140C and the flange bolt cavities 134A, 134C may be formed by the lower enclosure portion 106 and the upper enclosure portion 108 when the enclosure portions 106, 108 are connected to form the clamp 100, as shown in FIG. 1. A third axis 109 extends through the splitter block cavities 140B, 140D and the flange bolt cavities 134B, 134D. Third axis 109 may be perpendicular to the first axis 105 and the second axis 107. Third axis 109 may extend through a center of the splitter block cavities 140B, 140D and the flange bolt cavities 134B, 134D.

Figure 3:
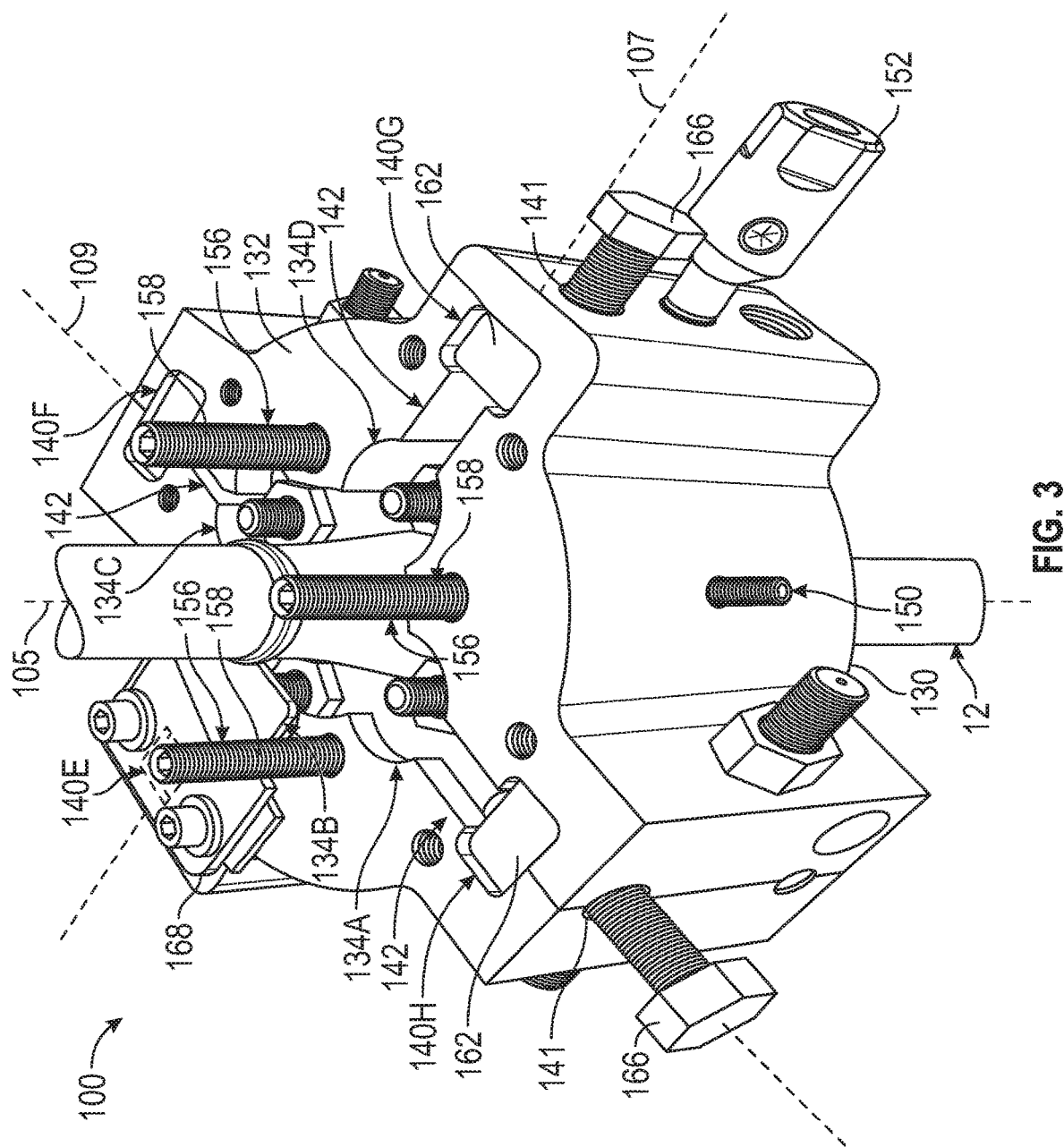
FIG. 3 is a perspective view of the hot bolt clamp assembled on a multi-bolt flange and showing a cutter tool apparatus according to embodiments of the present disclosure.

Referring to FIG. 1, a retaining plate 144 may be connected to the first enclosure face 130 using mechanical fasteners formed by bolts 146. Retaining plate 144 may extend over a face opening of a splitter block cavity 140. FIG. 1 shows the retaining plate 144 attached over the splitter block cavity 140B. Disposed in the splitter block cavity 140B is a splitter block 162. Splitter blocks 162 also are shown in FIG. 3. Fastener apertures 148 are disposed in the enclosure faces for attaching the retaining plate 144 over each of the splitter block cavities 140.

Restraint bolts 156 extend through each of the enclosure faces 130, 132. Restraint bolts include a restraint bolt shaft 158 and a restraint bolt nut 160. Clamp 100 may include four restraint bolts 156 in each of the enclosure faces 130, 132. Some embodiments of the clamp 100 may have less than four restraint bolts 156 or more than four restraint bolts 156. Restraint bolts 156 are disposed around the periphery of the central opening 129, shown in FIG. 5A and FIG. 5B, of the clamp 100. Restraint bolts 156 may each be disposed between two of the flange bolts 20. Restraint bolts 156 extending through the first enclosure face 130 each has one end extending from the first enclosure face 130 and a second end extending to a first flange surface 32. Restraint bolts 156 extending through the second enclosure face 132 each has one end extending from the second enclosure face 132 and a second end extending to a second flange surface 34. Restraint bolts 156 may be used to connect the flanges 16, 18 in a mated configuration when the flange bolts 20 are being removed and replaced.

Restraint bolts 158 may be positioned in a retracted position, as shown in FIG. 3 where restraint bolts 158 each are shown without the restraint bolt nut 160, shown in FIG. 2. A restraint bolt nut 160 may be added to connect the flanges 16, 18, shown in FIG. 2, in the mating configuration as the flange bolts 20 are being replaced.

Flange gap wedge apparatuses 150 extend through outer surface of the lower enclosure portion 106 and the upper enclosure portion 108. Flange gap wedge apparatuses 150 are configured to prevent over compression of a gasket disposed between the flanges 16, 18 when using the restraint bolts 156, as discussed further below.

Injection valves 152 each may include an injection port to fluidly couple the injection valve 152 to a sealant injection channel, not shown in FIG. 1 that is coupled to the sealant groove 118 shown in FIG. 2. As discussed further below, if a leak is detected at the flange connection, the injection valves 152 may be used to inject sealant through the sealant injection channels and to the sealant groove 118 and the injectable void surrounding the flange gap 44.

Referring to FIG. 3, a perspective view of the clamp 100 and the second enclosure face 132 according to embodiments of the present disclosure is shown. Clamp 100 includes a plurality of flange bolt cavities 134, splitter block cavities 140, and cutter channels 142 formed in the second enclosure face 132. FIG. 3 shows four flange bolt cavities 134 that are individually identified as flange bolt cavities 134A-134D and four splitter block cavities 140 that are individually identified as splitter block cavities 140E-140I1. One of the cutter channels 142 connects each of the flange bolt cavities 134A-134D to one of the splitter block cavities 140E-140I1. In some embodiments there may be less than four flange bolt cavities 134 and splitter block cavities 140. In some embodiments there may be less than four flange bolt cavities 134 and splitter block cavities 140.

As shown in FIG. 3, a splitter tool apparatus formed by a splitter block 162, a chisel 164, and a chisel bolt 166. Splitter block 162 may be slid through a face opening and in one of the splitter block cavities 140. Splitter block 162 may have a block aperture that is threaded and extends through the splitter block 162. Chisel 164 has a base end that may be connected to the splitter block 162 by inserting the base end into the block aperture and a cutter end that may be disposed adjacent to the flange nut 24. Chisel bolt 166 may have threads that mate with threads of the block aperture. Chisel bolt 166 may be extended through the bolt aperture 141 and through the block aperture in the splitter block 156 with a tool for rotating the chisel bolt 166. Chisel bolt 166 rotates through the block aperture and abuts the base end of the chisel 164 to apply a force to the chisel 164 and advance the chisel 164 radially inwards to cut the flange bolt nut 24.

A cutter guard 168 may be attached to the retaining plate 144 and extend over one of the flange bolt cavities 134. Cutter guard 168 may be transparent so that a user is able to see the flange bolt nut 24 disposed in the flange bolt cavity 134 and below the cutter guard 168. Cutter guard 168 provides the benefit of protecting a user from any fragments from the flange bolt nut 24 when using the chisel 164 to cut through the flange bolt nut 24 and remove the flange bolt nut 24 from the bolt shaft 22.

Figure 4:
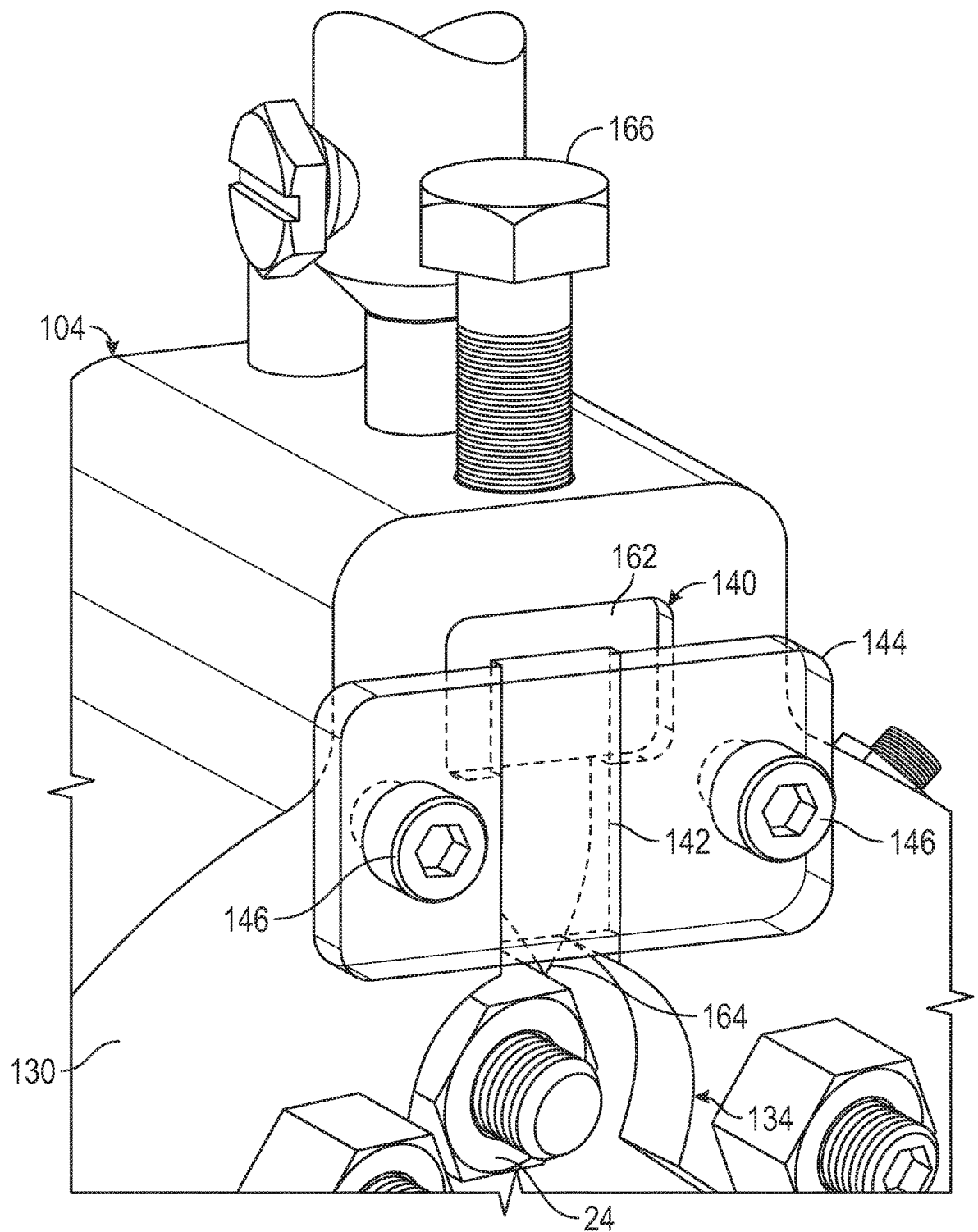
FIG. 4 is a perspective view of a portion of the hot bolt clamp assembled on a multi-bolt flange and showing an enlarged view of the cutter tool apparatus according to embodiments of the present disclosure.

Referring to FIG. 4, a portion of the upper enclosure 104 and the splitter tool apparatus is shown. Chisel bolt 166 is positioned in a bolt extended position where the chisel 164 extends through the cutter channel 142 and a distal end of the chisel 164 extends into the flange bolt cavity 134 and contacts the flange nut 20. Chisel bolt 166 has a bolt head and may be rotated with a wrench tool to further extend the chisel bolt 166 radially inward to press against the chisel 164 so that an edge of the chisel 164 cuts through the flange nut 20. A cutter guard 168, not shown, may be connected over the retainer plate 144 using bolts 146 extending in the first enclosure face 130.

Figure 5A:
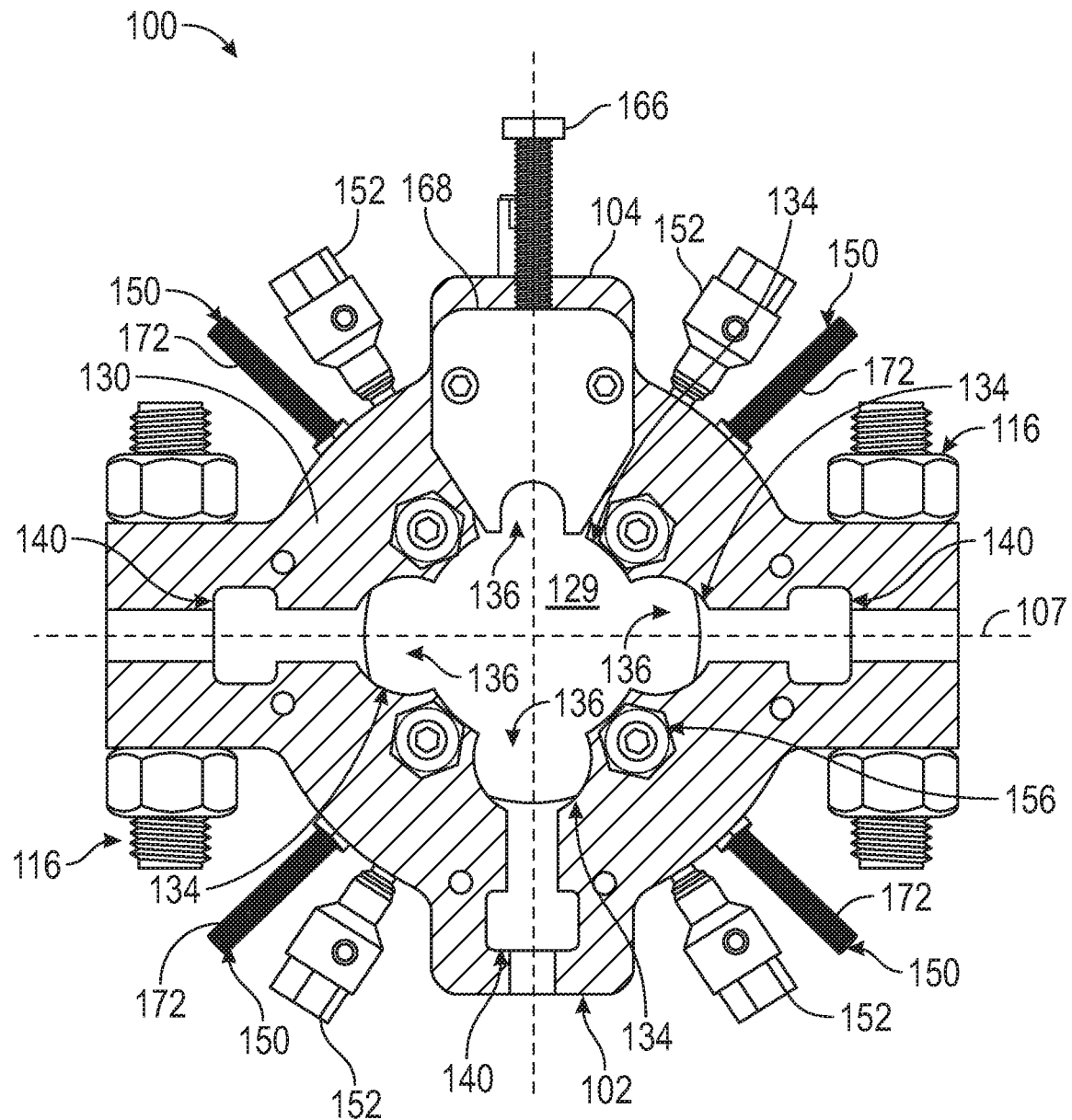
FIG. 5A is a front view of the hot bolt clamp without being assembled on the multi-bolt flange according to embodiments of the present disclosure.
Figure 5B:
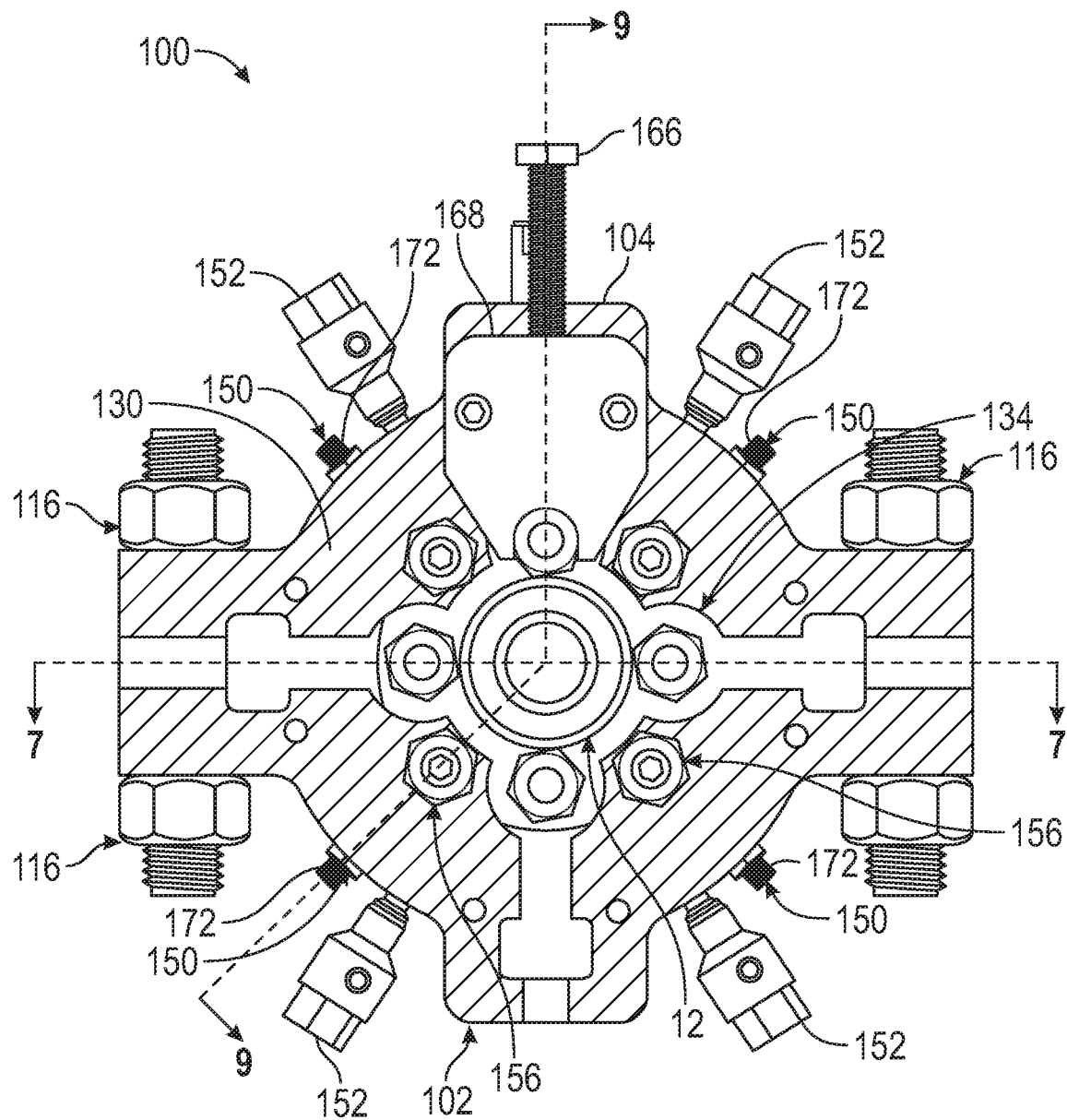
FIG. 5B is a front view of the hot bolt clamp shown in FIG. 5A assembled on the multi-bolt flange according to embodiments of the present disclosure.

Referring to FIG. 5A and FIG. 5B, clamp 100 is shown in a clamped position. FIG. 5A shows clamp 100 without a pipe extending through the central opening 129 configured for a pipe to extend therethrough. FIG. 5B shows clamp 100 in the clamped position around the pipe 12. Central opening 129 extends between the first enclosure face 130 and the second enclosure face 132. Flange bolt cavities 134 are circumferentially spaced around the central opening 129 and are spaced apart from one another and have a radial opening 136 leading from the flange bolt cavity 134 to the central opening 129. Each of the flange bolt cavities 134 is configured to fit around a periphery of one of the flange bolts 20, as shown in FIG. 5B.

Figure 9:
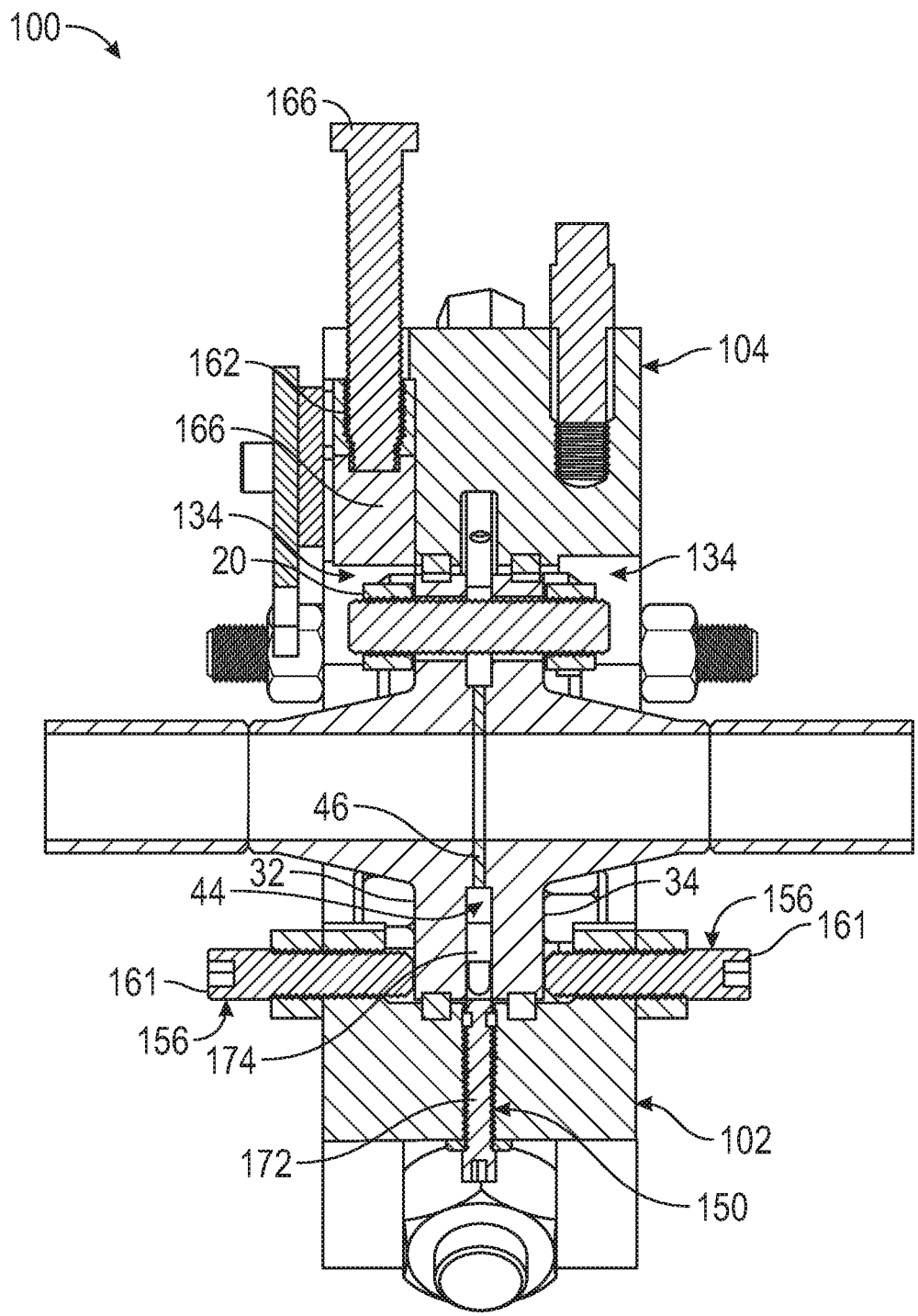
FIG. 9 is a cross-sectional view of the hot bolt clamp assembled on the multi-bolt flange taken along lines 9-9 of FIG. 5B according to embodiments of the present disclosure.

Flange gap wedge apparatus 150 includes a wedge deployment member 172 and a flange gap wedge 174 connected to a first end of the wedge deployment member 172, as shown in FIG. 9. Wedge deployment member 172 may be adjusted to position the flange gap wedge 174 in the flange gap 44, shown in FIG. 2. Wedge deployment member 172 may have a screw slot or a socket at a second end configured for a tool to rotate the wedge deployment member 172 to radially position the flange gap wedge 174. Wedge deployment member 172 may be formed by a wedge deployment screw.

Wedge deployment members 172 are shown in a retracted position in FIG. 3 and FIG. 5A where the flange gap wedge 174 is positioned radially outwards from the flange gap 44. Wedge deployment members 172 are shown in an extended position in FIG. 1 and FIG. 5B where the flange gap wedge 174 is positioned in the flange gap 44 to prevent over compression of a gasket disposed between the flanges 16, 18, see FIG. 9 and FIG. 10.

Figure 6:
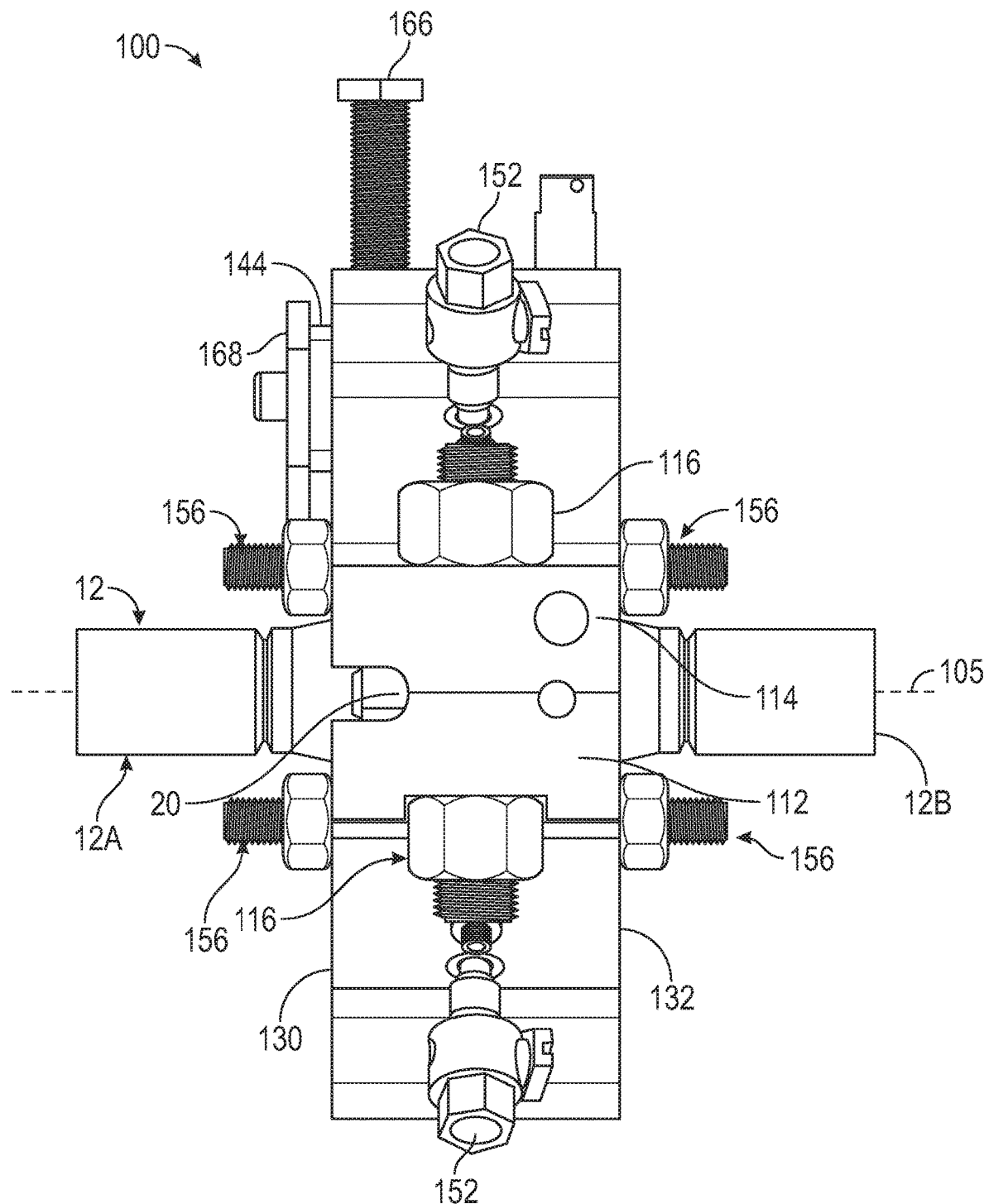
FIG. 6 is a side view of the hot bolt clamp assembled on the multi-bolt flange according to embodiments of the present disclosure.

Referring to FIG. 6, a side view of the clamp 100 shown in the clamped position around the pipe 12 is shown. Pipe 12 is shown extending through the clamp 100 with the first pipe section 12A extending from the first enclosure face 130 and the second pipe section 12B extending from the first enclosure face 132. Retaining plate 144 is attached to the first enclosure face 130 and the cutter guard 168 is attached over the retaining plate 144. A cut-away of the enclosure flanges 112, 114 is provided to show one of the flange bolts 20. Restraint bolts 156 extend through each of the enclosure faces 130, 132.

Referring to FIG. 7, a cross-section of the clamp 100 taken along lines 7-7 of FIG. 5B is shown. Pipe 12 extends through the clamp 100 along first axis 105. A gasket 46 is disposed between raised faces 40, 42 and a flange gap 44 is formed between the pipe flanges 16, 18. Gasket 46 and the flange gap 44 may each form an annular ring around a pipe passage extending through the pipe 12. Sealant groove 118 forms an annular groove that extends around the flange gap 44. In some embodiments, the clamp 100 may include a first annular packer 126 and a second annular packer 128 each disposed on an opposite side of the sealant groove 118 to form an annular ring around the flanges 16, 18 with the sealant groove 118 between the annular packers 126, 128.

Figure 8:
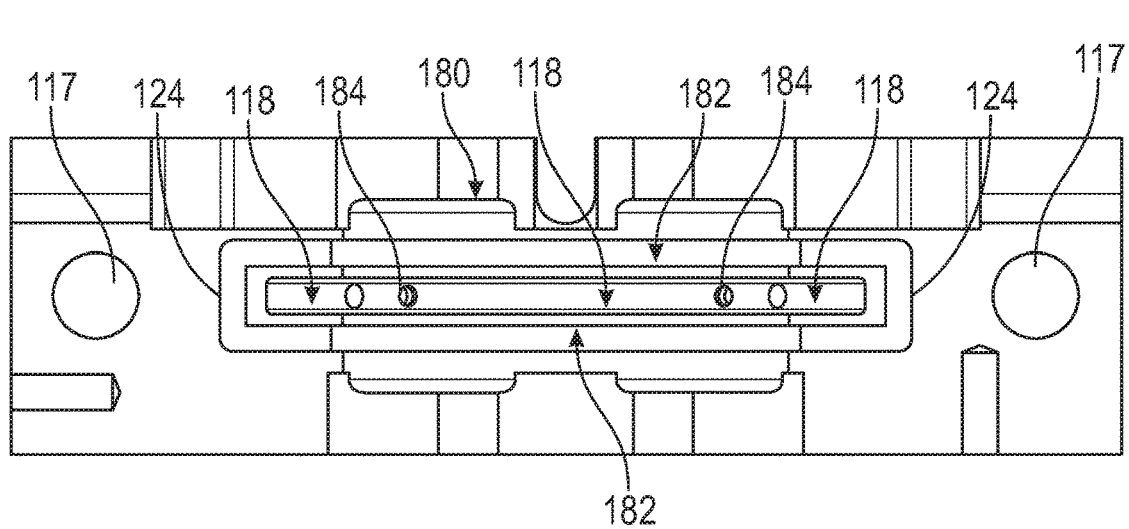
FIG. 8 is a top view of a lower enclosure of the hot bolt clamp according to embodiments of the present disclosure.

Referring to FIG. 8, a top view of the lower enclosure 102 according to embodiments of the present disclosure is shown. Upper enclosure 104 has similar components as the lower enclosure 102. A flange cavity 180 is formed in each of the enclosures 102, 104. Flange cavity 180 includes an enclosure internal surface 182. Enclosure internal surface 182 may have a concave shape extending in the body of each of the enclosures 102, 104 and is configured to accommodate the flanges 16, 18 shown in FIG. 2. Sealant groove 118 may form an annular groove in the enclosure internal surface 182 of the enclosures 102, 104. Sealant injection channels 184 open in the sealant groove 118. Sealant may be injected from the sealant valves 152, shown in FIG. 1, through the sealant injection channels 184 extending through the enclosures 102, 104, and to the sealant groove 118, as discussed further below.

Referring to FIG. 9, a cross-section of the clamp 100 taken along lines 9-9 of FIG. 5B is shown. Chisel bolt 166 extends through the splitter block 162 and an end of the chisel bolt 166 is disposed adjacent to the chisel 166. Chisel bolt 166 and splitter block 162 each have screw threads that mate with one another. Chisel bolt 166 is shown in a retracted position where the chisel 166 is disposed outwardly from the flange bolt cavity 134 and the flange bolt 20 in the flange bolt cavity 134.

Restraint bolts 156 are shown in FIG. 9 in the lower enclosure 102 of the clamp 100. Restraint bolts 156 are in a bolt extended position where a distal end or bolt abutment end of each of the restraint bolts 156 is positioned against one of the flange surfaces 32, 34. An adjustment end 161 of each of the restraint bolts 156 may include a socket for a tool for adjusting the restraint bolts 156 between the bolt extended position and the bolt retracted position.

Flange gap wedge apparatus 150 is shown in FIG. 9 in the lower enclosure 102 of the clamp 100 in a wedge extended position. Wedge deployment member 172 extends through the lower enclosure 102 to position the flange gap wedge 174 in the flange gap 44. Flange gap wedge 174 is sized to be wedged between the flanges 16, 18, in the flange gap 44 to prevent over compression of the gasket 46. Wedge apparatus 150 may be adjusted between the wedge extended position shown in FIG. 9 and the wedge retracted position where the flange gap wedge 174 is retracted from the flange gap 46 to position the flange gap wedge 174 radially outwards from the flanges 16, 18. Wedge deployment member 172 may have a screw slot or a socket at a second end configured for a tool to rotate the wedge deployment member 172 to radially position the flange gap wedge 174.

Figure 10:
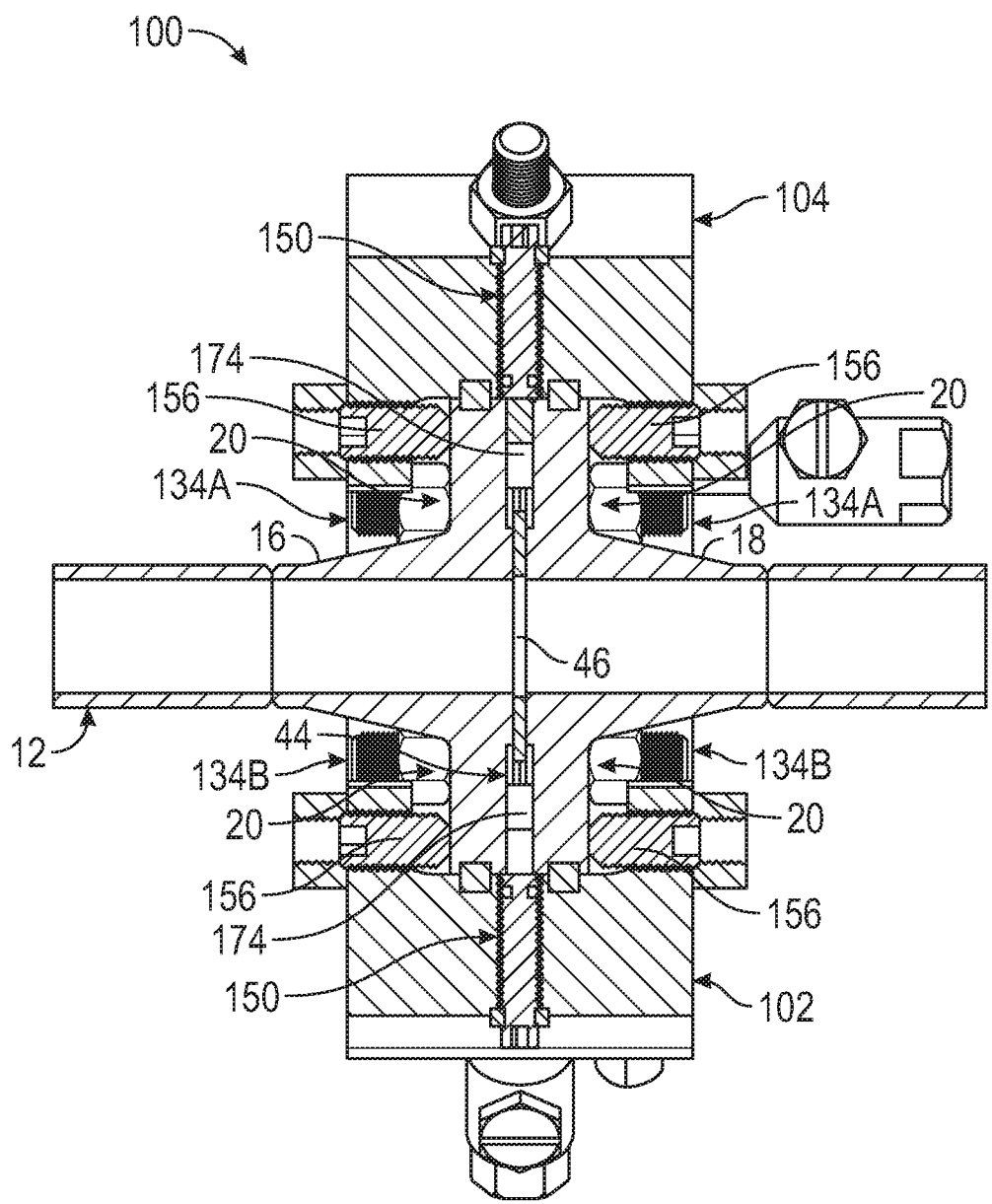
FIG. 10 is a side cross-sectional view of the hot bolt clamp assembled on the multi-bolt flange and showing flange gap wedge apparatuses and restraint bolts according to embodiments of the present disclosure.
Figure 11:
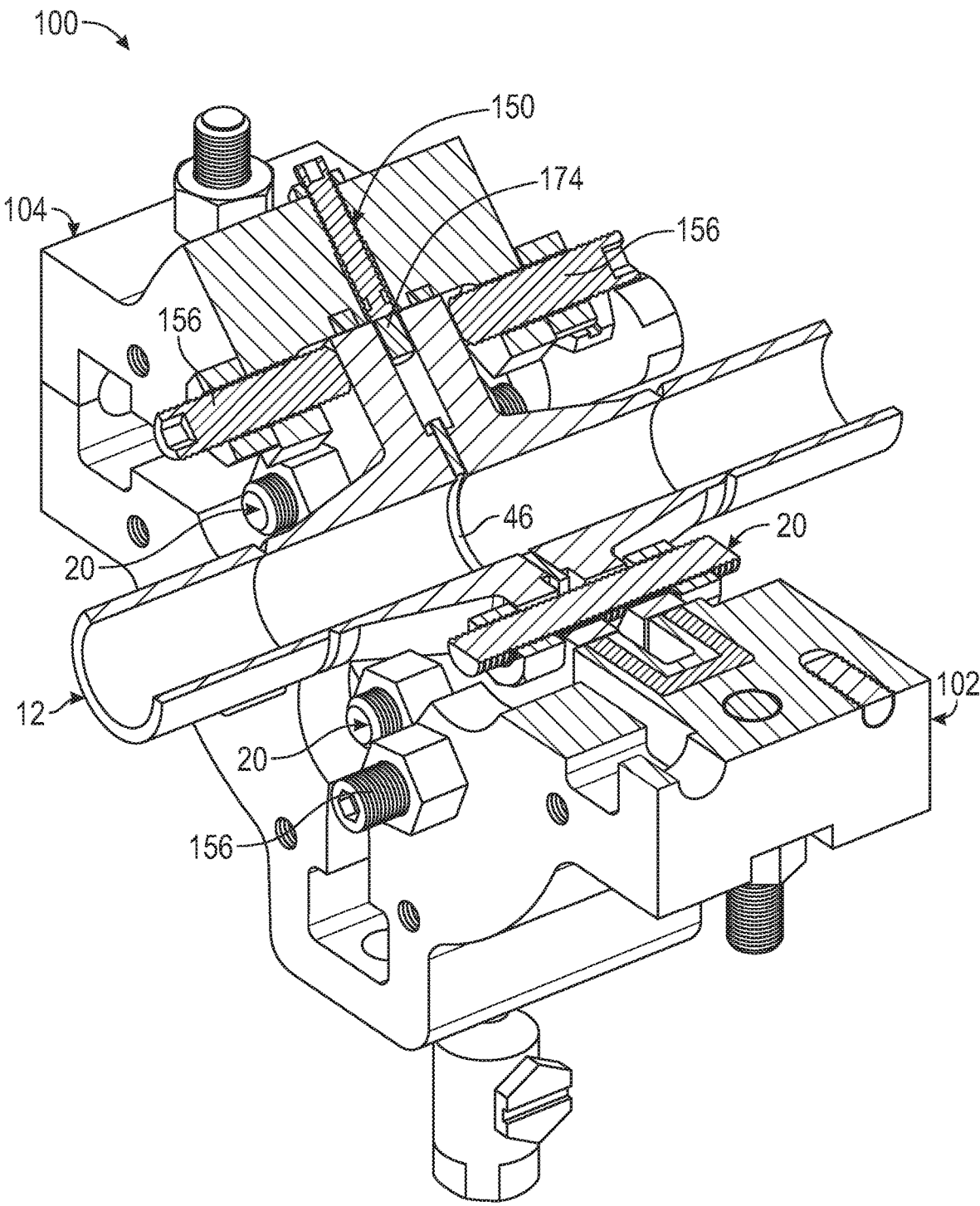
FIG. 11 is a perspective cross-sectional view of the hot bolt clamp assembled on the multi-bolt flange and showing a flange gap wedge apparatus and restraint bolts according to embodiments of the present disclosure.

Referring to FIG. 10 and FIG. 11, flange gap wedges 174 are activated to maintain the flange gap 44, thus preventing over-compression of the gasket 46 within the flanges 16, 18. Flange gap wedges 174 may be activated by adjusting the position of the flange gap wedge apparatus 150, as discussed with respect to FIG. 9. In this manner, failure of the gasket 46 is prevented during the hot bolting process. Flange gap wedges 174 do not necessarily need to be wedge shaped. Flange gap wedges 174 may be of any number of sizes and shapes so long as they function to restrain the axial load and prevent over-compression of the gasket 46.

Restraint bolts 156 may be torqued to a predetermined value to maintain integrity of the flange connection and gasket 46. Restraint bolts 156 extend through the enclosure faces 130, 132 to pipe flanges 16, 18 through a restraint bolt aperture, as shown in FIG. 10. Once the restraint bolts 156 are properly torqued, the flange bolts 20 may be removed one at a time. If one or more of the flange bolts 20 are unable to be removed conventionally with a rotational tool such as a wrench, the splitter tool apparatus, shown in FIG. 3 and FIG. 4, may be used to remove the stuck flange bolts 20. Other embodiments of the splitter tool apparatus may be used to advantage in the present disclosure and remain within the purview of the disclosure.

Figure 12:
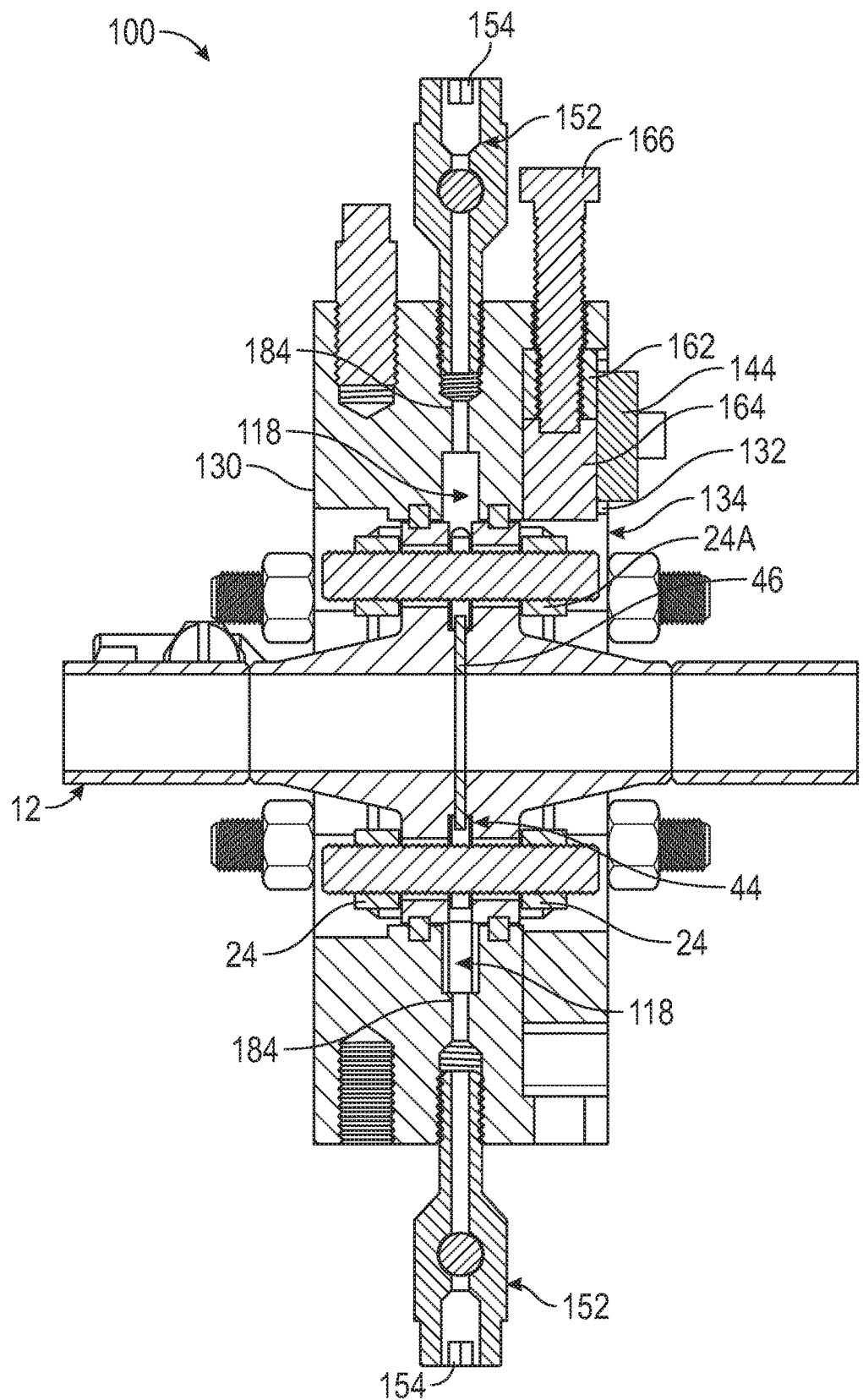
FIG. 12 is a side cross-sectional view of the hot bolt clamp assembled on the multi-bolt flange and showing sealant valves connected to sealant injection channels leading to an injectable void according to embodiments of the present disclosure.
Figure 13:
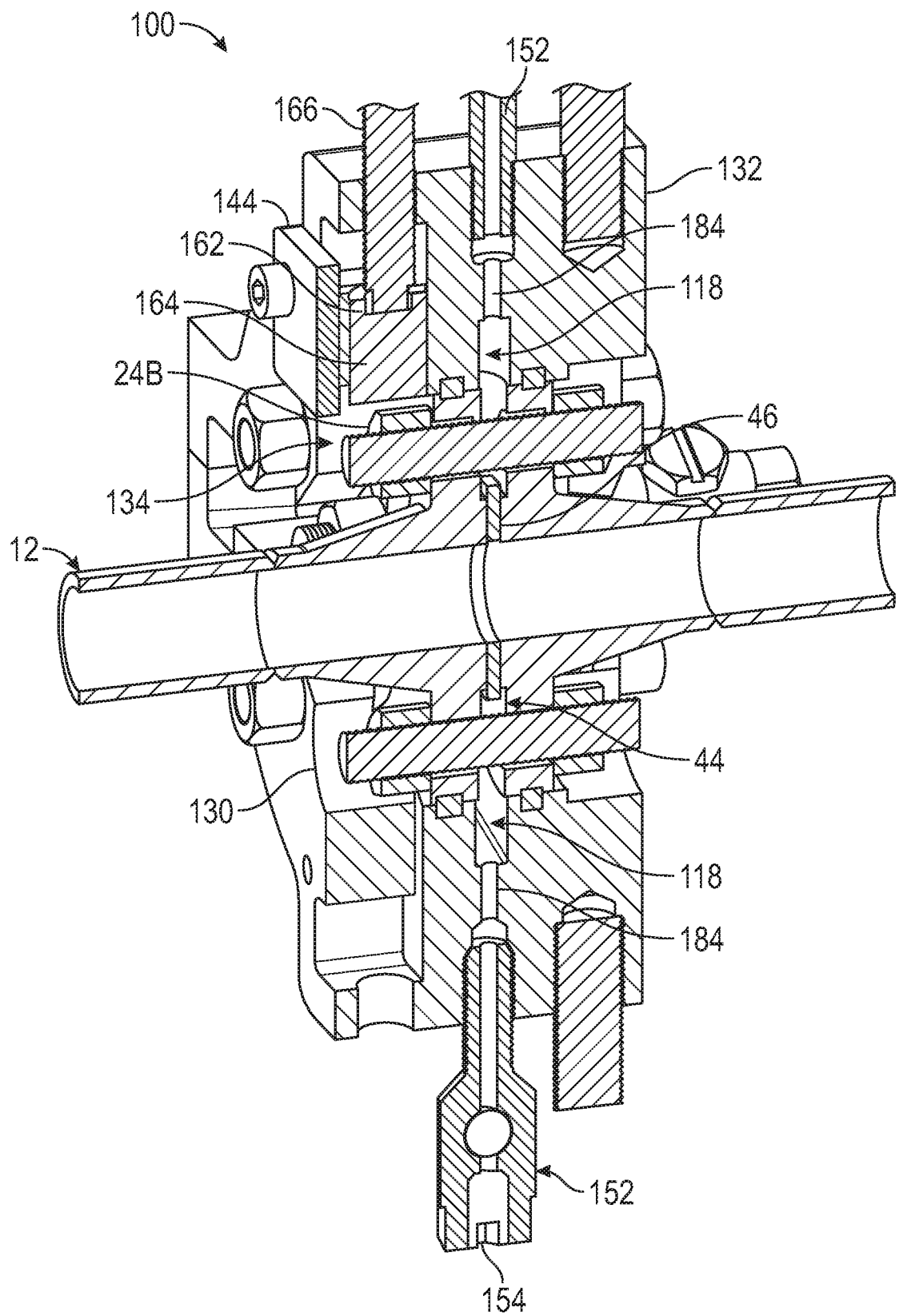
FIG. 13 is a perspective cross-sectional view of the hot bolt clamp assembled on the multi-bolt flange and showing sealant valves connected to sealant injection channels leading to an injectable void according to embodiments of the present disclosure.

FIGS. 12 and 13 illustrate embodiments of the present disclosure that may comprise an injectable void surrounding the gasket 46. The integrity of the gasket 46 can be monitored either by venting the void to atmosphere if appropriate or using a pressure gauge, not shown, that may be connected to the sealant valve 152. If at any point the gasket integrity of the gasket 46 is lost, the injectable void can be injected through an injection port 154 in each of the sealant valves 152 to provide an on-stream repair suitable to remain until the next available shutdown. Injection port 154 of each of the sealant valves 152 is fluidly connected to a sealant injection channel 184 that extends through the clamp 100 to the sealant groove 118. Sealant groove 118 extends around the periphery of the flange gap 44. Sealant groove 118 and the flange gap 44 form the injectable void.

The splitter tool apparatus formed by the splitter block 162, the chisel 164, and the chisel bolt 166 may be positioned on the clamp 100 at different locations to remove one or more flange nuts 24 that may become stuck. In FIG. 12, a flange bolt nut 24A in a flange bolt cavity 134 in the second enclosure face 132 may become stuck and the splitter tool apparatus may be positioned as shown to cut and remove the flange bolt nut 24A using the splitter tool apparatus. In FIG. 13, a flange bolt nut 24B in the flange bolt cavity 134 in the first enclosure face 130 may become stuck and the splitter tool apparatus may be positioned as shown to cut and remove the flange bolt nut 24A using the splitter tool apparatus.

In operation, embodiments of the present disclosure may be used to repair a multi-bolt flange of a pipe. The pipe and the flange may be under pressure from a fluid in the pipe. The multi-bolt flange may have four (4) flange bolts in an example embodiment. The flange bolts each extend through the multi-bolt flange. For example, a first bolt extends through the multi-flange with a first flange bolt nut disposed adjacent to a first flange face and a second flange bolt nut disposed adjacent a second flange face. A repair of the pipe may be needed to repair a leak or potential leak or to replace worn flange bolts. The method used to repair the multi-bolt flange includes connecting the lower enclosure and the upper enclosure around the multi-bolt flange to form a clamp body having a first enclosure face and a second enclosure face. Enclosure bolts may be used to connect the lower enclosure and the upper enclosure to mount the clamp to the pipe.

Retaining bolts can be used to secure the multi-bolt flange before loosening or removing flange bolts. Retaining bolts can be positioned from a retaining bolt retracted position to a retaining bolt extended position. The retaining bolts may be adjusted and torqued with a tool to connect the multi-bolt flange securely together. Each of the retaining bolts has a distal end that presses against either the first flange face or the second flange face when the retaining bolts are in the extended position to secure the multi-bolt flange. With the retaining bolts in the extended position, a first flange bolt nut from the first flange bolt cavity can be removed. The retaining bolts withstand loads on the multi-bolt flange, including axial load. If the first flange bolt nut is disposed at the first enclosure face, the first flange bolt nut can be removed by inserting a tool from outside the first enclosure face and in the flange bolt cavity containing the first flange bolt nut. If the first flange bolt nut is disposed at the second enclosure face, the first flange bolt nut can be removed by inserting a tool from outside the second enclosure face and in the flange bolt cavity containing the first flange bolt nut.

A first replacement nut can be used to replace the first flange bolt nut that was removed. In some operations, multiple flange bolts and flange nuts may be removed, and replacement flange bolts can be connected to the multi-bolt flange to secure the multi-bolt flange with replacement bolts. In this manner, worn flange bolts may be safely replaced with the pipe and the flange under fluid pressure so that the pipeline does not have to be shut-down to make repairs the multi-bolt flange.

Operations can be performed to prevent over-torqueing the restraining bolts when positioning the restraining bolts to secure the multi-bolt flange. The multi-bolt flange may have a flange gap where the restraining bolts apply a compression force that may tend to compress the multi-bolt flange and potentially damage a flange gasket. The operation can include positioning a flange gap wedge from a wedge retracted position to a wedge extended position to wedge the flange gap wedge in the flange gap to limit compression of the multi-bolt clamp by the restraint bolts. The flange gap wedge may have a wedge deployment member extending through the clamp body to position the flange gap wedge.

The hot-bolt clamp may also be used to remove a flange nut that is stuck and resistant to removal with a rotating tool, such as a wrench. Removing the first flange bolt nut from the first flange bolt cavity can include positioning a cutter tool apparatus radially inward from a tool retracted position to a tool extended position to position the cutter apparatus tool in the first flange bolt cavity to cut the first flange bolt nut to remove the first flange bolt nut from the first flange bolt.

Removing a flange nut can include inserting a splitter block through the first enclosure face and in a first splitter block cavity. A chisel bolt may be insert through the splitter block. The chisel bolt is positioned radially inward through the cutter channel to position the chisel radially inward as the cutter tool apparatus is positioned from the tool retracted position to the tool extended position.

Flange bolts can be removed individually from the multi-bolt flange using embodiments of the hot bolt clamp. The flange nuts may be removed from both the first flange face and the second flange face once the clamp have been mounted or assembled on the pipe and the restraining bolts positioned in the restraining bolt extended position.

An embodiment of the present disclosure provides a hot bolt clamp for assembly around a bolted flange connection to maintain the integrity of the flange gasket. The hot bolt clamp may include a plurality of enclosures that may be formed by enclosure halves secured around the flange connection; a plurality of flange gap wedges activated to maintain the flange gap around the gasket; restraint bolts to maintain the integrity of the flange to enable the bolts of the flange to be removed; a nut splitter to remove stuck flange bolts; and injection ports to enable injection of sealant around the bolted flange.

An embodiment of the present disclosure provides a method for repairing one or more leaks in a bolted flange connection through use of a hot bolt clamp, the method including securing the hot bolt clamp around the bolted flange; activating gap wedges to maintain the flange gap around the gasket; torqueing restraint bolts in the hot bolt clamp to maintain the integrity of the flange; and removing the flange bolts.

The hot bolt clamp provides a user to remove flange fasteners, referred to as flange bolts, to be removed and replaced individually in a safe manner maintaining a safe working environment. The use of the hot bolt clamp during bolting operations ensures axial loads formulated due to internal pressures are supported throughout the removal operations. The hot bolt clamp prevents the multi-bolt flange from rotating during the operation and has built-in nut splitting capabilities. If there is a loss of gasket integrity of the multi-bolt flange during the operation, sealant can be injected to seal the enclosure surrounding the multi-bolt flange and seal a leak in the multi-bolt flange. After seal injection, the hot bolt clamp can be left on the multi-bolt flange until the next available shut-down of the pipe.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A hot bolt clamp for assembly around a multi-bolt flange of a pipe, comprising:
   a lower enclosure and an upper enclosure positionable around the multi-bolt flange to form a clamp body having a first enclosure face and a second enclosure face, and the lower enclosure and the upper enclosure forming a central opening extending through the first enclosure face and the second enclosure face;
   a plurality of flange bolt cavities extending through the first enclosure face and the second enclosure face and extending around the central opening;
   a plurality of restraint bolts extendable through the first enclosure face and the second enclosure face and extending around the central opening;
   a plurality of cutter channels in the first enclosure face and the second enclosure face connecting to the plurality of flange bolt cavities;
   a cutter tool apparatus extendable through at least one of the plurality of cutter channels to access at least one of the flange bolt cavities; and
   a sealant injection channel extending through the clamp body to the central opening.

2. The hot bolt clamp of claim 1, wherein each flange bolt cavity has a radial cavity opening to the central opening.

3. The hot bolt clamp of claim 2, wherein the plurality of restraint bolts extends around the central opening and between the plurality of flange bolt cavities.

4. The hot bolt clamp of claim 1, further comprising a plurality of splitter block cavities in the first enclosure face and the second enclosure face and disposed radially outwards from the plurality of flange bolt cavities, and the plurality of splitter block cavities connected to the plurality of flange bolt cavities by the plurality of cutter channels.

5. The hot bolt clamp of claim 4, further comprising a splitter block insertable in the plurality of splitter block cavities through either the first enclosure face or the second enclosure face.

6. The hot bolt clamp of claim 5, further comprising a chisel having a chisel end disposable in each of the plurality of cutter channels and a chisel bolt extendable through the splitter block, and wherein the chisel bolt is radially adjustable to position the chisel radially inward from a retracted position to an extended position to position the chisel end in one of plurality of flange bolt cavities.

7. The hot bolt clamp of claim 6, further comprising a retaining plate connectable to either the first enclosure face or the second enclosure face to block one of the inserted plurality of splitter block cavities from removal through either the first enclosure face or the second enclosure face.

8. The hot bolt clamp of claim 6, further comprising a cutter guard connectable to either the first enclosure face or the second enclosure face to cover at least a portion of the plurality of flange bolt cavities.

9. The hot bolt clamp of claim 1, further comprising a flange gap wedge apparatus having a flange gap wedge and a wedge deployment member extending through the clamp body, and wherein the wedge deployment member is radially adjustable to position the flange gap wedge radially inward from a retracted position to an extended position to position the flange gap wedge to the central opening.

10. The hot bolt clamp of claim 1, further comprising:
    an enclosure internal surface formed by the lower enclosure and the upper enclosure; and
    a sealant groove in the enclosure internal surface extending around the central opening and connected to the sealant injection channel.

11. The hot bolt clamp of claim 10, further comprising a sealant valve connected at an outer surface of the clamp to the sealant channel for injecting sealant in the sealant channel.

12. A method of repairing a multi-bolt flange of a pipe having a first bolt extending through the multi-bolt flange with a first flange bolt nut disposed adjacent a first flange face and a second flange bolt nut disposed adjacent a second flange face, using a hot bolt clamp, the hot bolt clamp including:
    a lower enclosure and an upper enclosure positionable around the multi-bolt flange to form a clamp body having a first enclosure face and a second enclosure face, and the lower enclosure and the upper enclosure forming a central opening extending through the first enclosure face and the second enclosure face;
    a plurality of flange bolt cavities extending through the first enclosure face and the second enclosure face and extending around the central opening;
    a plurality of restraint bolts extendable through the first enclosure face and the second enclosure face and extending around the central opening;
    a plurality of cutter channels in the first enclosure face and the second enclosure face connecting to the plurality of flange bolt cavities;
    a cutter tool apparatus extendable through at least one of the plurality of cutter channels to access at least one of the flange bolt cavities; and
    a sealant injection channel extending through the clamp body to the central opening; and
    wherein the plurality of flange bolt cavities includes a first flange bolt cavity; and the method further comprising:
connecting the lower enclosure and the upper enclosure around the multi-bolt flange to position the first flange bolt nut and the second flange bolt nut in the first flange bolt cavity on opposite sides of the multi-bolt flange;
positioning the plurality of retaining bolts from a retaining bolt retracted position to a retaining bolt extended position where each of the plurality of retaining bolts has a distal end pressing against either the first flange face or the second flange face;
removing the first flange bolt nut from the first flange bolt cavity; and
replacing the first flange bolt nut with a first replacement nut.

13. The method of claim 12, further including a flange gap wedge apparatus having a flange gap wedge and a wedge deployment member extending through the clamp body, and wherein the wedge deployment member is radially adjustable to position the flange gap wedge radially inward from a retracted position to an extended position to position the flange gap wedge in the central opening, and wherein the multi-bolt flange has a flange gap extending around the multi-bolt flange; and the method further comprising:
positioning the flange gap wedge from the retracted position to an extended position to wedge the flange gap wedge in the flange gap to limit compression of the multi-bolt clamp by the plurality of restraint bolts.

14. The method of claim 12, wherein removing the first flange bolt nut from the first flange bolt cavity includes positioning the cutter tool apparatus radially inward from a tool retracted position to a tool extended position to position the cutter apparatus tool in the first flange bolt cavity to cut the first flange bolt nut to remove the first flange bolt nut from the first flange bolt.

15. The method of claim 14, further including:
a plurality of splitter block cavities in the first enclosure face and the second enclosure face and disposed radially outwards from the plurality of flange bolt cavities, and the plurality of splitter block cavities connected to the plurality of flange bolt cavities by the plurality of cutter channels;
a splitter block insertable in the plurality of splitter block cavities through either the first enclosure face or the second enclosure face;
a chisel having a chisel end disposable in each of the plurality of cutter channels and a chisel bolt extendable through the splitter block, and wherein the chisel bolt is radially adjustable to position the chisel radially inward from the tool retracted position to the tool extended position to position the chisel end in one of plurality of flange bolt cavities; and
wherein the plurality of splitter block cavities includes a first splitter block cavity and the plurality of cutter channels includes a first cutter channel at the first enclosure face and connecting the first flange bolt cavity to the first splitter block cavity; and
wherein positioning the cutter tool apparatus radially inward from the tool retracted position to the tool extended position includes:
inserting the splitter block through the first enclosure face and in the first splitter block cavity;
inserting the chisel bolt through the splitter block; and
positioning the chisel bolt radially inward through the cutter channel to position the chisel radially inward as the cutter tool apparatus is positioned from the tool retracted position to the tool extended position.

16. The method of claim 12, further including:
an enclosure internal surface formed by the lower enclosure and the upper enclosure; and
a sealant groove in the enclosure internal surface extending around the central opening and connected to the sealant injection channel; and
the method further comprising injecting sealant through the sealant injection channel to the sealant groove to seal the flange gap.

17. A hot bolt clamp for assembly around a multi-bolt flange of a pipe, comprising:
a lower enclosure and an upper enclosure positionable around the multi-bolt flange having a first enclosure face and a second enclosure face, and the lower enclosure and the upper enclosure forming a central opening extending through the first enclosure face and the second enclosure face;
a plurality of flange bolt cavities extending through the first enclosure face and the second enclosure face and extending around the central opening;
a plurality of restraint bolts extendable through the first enclosure face and the second enclosure face and extending around the central opening; and
a plurality of cutter channels in the first enclosure face and the second enclosure face connecting to the plurality of flange bolt cavities.

18. The hot bolt clamp of claim 17, further comprising a sealant injection channel connecting to the central opening, and wherein each flange bolt cavity has a radial cavity opening to the central opening.

19. The hot bolt clamp of claim 18, wherein each cutter channel is connected to one of the plurality of flange bolt cavities and is positioned radially outward from the connected one of the plurality of flange bolt cavities.

* * * * *